United States Patent
Binzinger

(10) Patent No.: US 7,904,680 B2
(45) Date of Patent: *Mar. 8, 2011

(54) DATA ACCESS MANAGEMENT SYSTEM AS WELL AS A METHOD FOR DATA ACCESS AND DATA MANAGEMENT FOR A COMPUTER SYSTEM

(75) Inventor: Thomas Binzinger, Baldham (DE)

(73) Assignee: AC Technologies S.A., Leithum (LU)

( * ) Notice: Subject to any disclaimer, the term of this patent is extended or adjusted under 35 U.S.C. 154(b) by 909 days.

This patent is subject to a terminal disclaimer.

(21) Appl. No.: 11/188,025

(22) Filed: Jul. 23, 2005

(65) Prior Publication Data

US 2005/0273504 A1 Dec. 8, 2005
US 2007/0244992 A9 Oct. 18, 2007

Related U.S. Application Data

(63) Continuation of application No. 09/903,431, filed on Jul. 10, 2001, now Pat. No. 7,000,084, which is a continuation of application No. PCT/EP2000/000141, filed on Jan. 11, 2000.

(51) Int. Cl.
*G06F 12/14* (2006.01)
(52) U.S. Cl. .................... 711/162; 707/634; 709/214
(58) Field of Classification Search .................... None
See application file for complete search history.

(56) References Cited

U.S. PATENT DOCUMENTS

| 5,459,837 | A | 10/1995 | Caccavale |
| 5,515,500 | A | 5/1996 | Mizuno et al. |
| 5,634,125 | A * | 5/1997 | Li ................................. 707/203 |
| 5,668,986 | A * | 9/1997 | Nilsen et al. .................... 707/10 |
| 5,841,962 | A | 11/1998 | Nakamura et al. |
| 6,081,907 | A | 6/2000 | Witty et al. |
| 6,085,251 | A | 7/2000 | Fabozzi, II |
| 6,339,785 | B1 | 1/2002 | Feigenbaum |

(Continued)

FOREIGN PATENT DOCUMENTS

EP 0 767 585 A2 4/1997

(Continued)

OTHER PUBLICATIONS

U.S. Appl. No. 11/515,507, filed Sep. 5, 2006, Binzinger.

(Continued)

*Primary Examiner* — Gary J Portka
(74) *Attorney, Agent, or Firm* — Rothwell, Figg, Ernst & Manbeck, P.C.

(57) ABSTRACT

The present invention permits improved data access and improved data management in a computer system. To this end, data are divided into individual partial data (F) and stored in cells (Z) of storage devices (C) in such a way that the partial data (F) being accessed and managed are present in the computer system in a redundant manner. Computer units (CL) are able to access the redundantly stored data. The fact that they are stored in the storage devices (C) ensures that the computer units (CL) accessing said data are supplied more rapidly. This is achieved in particular owing to the fact that the redundantly stored data are accessed in accordance with parameters of data transmissions between the computer units (CL) and the data storage devices (C) and that, in accordance with said data transmission parameters, the redundantly stored data are moved to and from the data storage devices (C) by corresponding copy and delete operations.

15 Claims, 3 Drawing Sheets

U.S. PATENT DOCUMENTS 7,000,084 B2    2/2006    Binzinger

FOREIGN PATENT DOCUMENTS

| EP | 0 884 870 A2 | 12/1998 |
|----|--------------|---------|
| WO | WO 98/18076 | 4/1998 |
| WO | WO 98/26559 | 6/1998 |

OTHER PUBLICATIONS

Abbasov, "Optimizing the Location of Databases with Copies in Computer Networks," Avtomatika I Vychislitel'naya Tekhnika, vol. 22, No. 4, pp. 58-62, 1988.

BitTorrent Source Code, Circa Jul. 1, 2001, 96 pp.

* cited by examiner

DATA ACCESS MANAGEMENT SYSTEM AS WELL AS A METHOD FOR DATA ACCESS AND DATA MANAGEMENT FOR A COMPUTER SYSTEM

CROSS REFERENCE TO RELATED APPLICATIONS

This application is a continuation of application Ser. No. 09/903,431, filed Jul. 10, 2001, now U.S. Pat. No. 7,000,084, which was a continuation of international application PCT/EP2000/000141, filed Jan. 11, 2000, which claims priority to German patent application number 199 00 636.9, filed on Jan. 11, 1999 and entitled "DATA ACCESS AND MANAGEMENT SYSTEM AS WELL AS A METHOD FOR DATA ACCESS AND DATA MANAGEMENT FOR A COMPUTER SYSTEM".

BACKGROUND OF THE INVENTION

1. Field of the Invention

The invention generally relates to a data access and management system as well as to a method for data access and data management for a computer system. In particular, the present invention relates to a system and a method for optimising the access to data and their processing in distributed and networked computer structures.

2. Description of the Prior Art

The ever increasing use of distributed and networked computer structures and arrangements has the consequence that data and functionalities for data management purposes are no longer provided or utilised, respectively, by consistent computer systems, but by various distributes computer systems which are internetworked. In conventional distributed and networked computer structures and arrangements data and functionalities are generally provided by a central computer system, a so-called server, or an accumulation of central computer systems, so-called server clusters. Other computer systems, so-called clients, such as for example, personal computers are connected e.g. via networks or busses with the central computer system in order to access data and functionalities. In this context, various problems occur which limit the supply of clients with data and/or functionalities, in particular, if the access to a central computer system is done by several clients in a short period of time or even simultaneously. An example for this is computer games, which are supplied to several players via the Internet.

Due to the fact that only one central computer system (server) is used, its failure results in that the clients can no longer access provided data and functionalities. The failure of network areas, too, which connect the server with the clients, also leads to a total failure of the entire computer structure.

Moreover, the transmission times from the server to individual clients differ greatly in part because the connection quality to the clients varies e.g. due to various distances between the server and the clients as well as different transmission performances in various areas of the network. In particular, with interactive operations of several clients in connection with the server, such an inadequate transmission characteristic often leads to an unsatisfactory supply of individual clients with data/functionalities. In this context, the so-called "lags" must be mentioned which affect the communication between the server and the clients.

SUMMARY OF THE INVENTION

It is an object of the present invention to eliminate the above mentioned problems of the known state of the art. In particular, it is an object of the invention to optimise the transmission quality between clients and means of a networked distributed computer structure which provide data in such a manner that each client is provided with the respectively requested data in a desired application-specific manner. Preferably, the invention is to enable an as rapid as possible supply with data/functionalities, whereby it is additionally to be ensured that the transmissions are effected as fault-tolerantly as possible.

In addition, the present invention secures the operability of a distributed networked computer system in the case of the failure of data providing means of the computer structure. The invention is also to secure the operability of a distributed networked computer system in the case of the failure of individual areas of the networks via which the data providing means and clients are connected with each other.

Furthermore, the invention is to enable that clients are only provided with current data. The invention also intends to reduce the required transmission capacities of a networked distributed computer system.

In the inventive system according to the present invention, the data provided in a computer system is stored in a redundant manner in the data storage means, depending on prespecified parameters of the data transmission between data storage means and computer units, and the computer units access one of the data storage means as a function of the determined prespecified parameters. In this manner it is made possible to optimise data transmissions between the data storage means and the computer units in the desired application-specific manner in order to be carried out more rapidly and in a manner involving fewer faults.

In addition, the data storage means comprise control unit for controlling the data access and the data management in order to work independent of other means of the computer system. This reduces the quantity of the data to be transmitted in the inventive system and increases the fault tolerance of the inventive system because the data are not processed centrally.

For achieving an additional optimisation it is to be preferred that the data storage means copy redundantly stored data in the system among each other as a function of the determined parameters of data transmissions between the individual data storage means and the computer unit and delete the data in the data storage means in which it had been stored beforehand. Data can thus be shifted in the inventive system from one data storage means to other data storage means, whose parameters of the data transmission enable a higher degree of optimisation of the data access and the data management for the respective application case of the invention.

Moreover, it is to be preferred that the data storage means process the stored data independently from the computer unit. In this manner data can be processed in a decentralised way whereby increased data integrity and an increased fault tolerance as well as a relief of individual system components is achieved. In another embodiment the data in the system is divided into data subsets, and the data storage means are divided into cells in such a manner that each of the data subsets to be stored in a redundant manner is stored in one of the cells each of the corresponding data storage means in order to only store that data in a redundant manner which is currently required.

In addition, it is advantageous that the data storage means are divided into cells depending on data transmission parameters in order to further optimise the data transmissions within the inventive system.

In order to carry out the data access and the data management in a more efficient manner each cell may comprise additional data which relates to parameters of data transmissions between the individual data storage means and the computer unit, and/or neighbouring cells, and/or cells which comprise data which is stored in the system in a redundant manner.

In addition, it is possible to use cells which can interchange additional data which is used for the data access and the data management. Thus, the information for data access and data management to be transmitted in the inventive system is reduced further.

The cells in special data storage means can be designed in such a manner that the parameters of data transmission between the individual data storage means and the computer unit are identical for the cells of a data storage means in order to achieve a consistent data access for the individual data storage means.

It is also possible to use computer units which output data for storage in the data storage means and/or process data stored in the data storage means in order to relieve the data storage means.

For processing the data independent of the inventive system, the computer units can also be connected with one or several users in order to transmit the data from the data storage means and/or to be controlled by the user. Such a user is preferably a personal computer, and/or a central processing unit of a computer and/or another data storage means.

In this manner, the computer unit can also be a system which provides Internet services such as e.g. data base access operation and computer games. The computer unit can also be suited to immediately access individual cells of the data storage means, which relieves the individual data storage means of data access and data management tasks.

In particular, the prespecified parameters of data transmissions between the individual data storage means and the computer unit can comprise the duration of the transmission, and/or the fault rate, and/or the duration of data processing operations of the individual data storage means prior to the transmission of the data. In this manner, data can be accessed more rapidly and data is provided which is less faulty.

The individual components of the inventive system according to an embodiment of the present invention are connected with each other via data transmission means, which can comprise electrically conductive connections, and/or bus systems, and/or computer networks, and/or wired or wireless (mobile) telephone networks, and/or the Internet. The present invention is thus suited for each computer structure and arrangement as well as for each computer system which utilises distributed and networked means.

When using the present invention, it is therefore possible to build a database system or a computer structure for data access and data management with an inventive database system or an inventive computer structure being able to be built from components which are arranged locally in a neighbouring relation.

Moreover, the present invention can be used in a system for a computer game which is provided via the Internet. In this case, it is to be preferred that at least one computer unit is an Internet service provider in order to integrate the present invention into existing computer structures of the Internet and in order to enable Internet users an inventive access to the data.

In particular, the invention is suited for interactive computer games for use by at least two users in order to ensure an optimised supply of the individual user with data required for the computer game, whereby each user can be connected with one computer unit.

Preferably, data for executing the computer game is transmitted from the computer units to the users so that the computer game can also be carried out—at least partially—independent of the computer units. Another relief of the computer units and the data storage means can be obtained if the users process the received data for executing the computer game and transmit it back to the corresponding computer units.

Moreover, the inventive system for a computer game can comprise additional means for the detection of prespecified parameters of the data transmission between the computer units and the respectively connected users in order to additionally optimise the data access and the data management. Preferably, these prespecified parameters comprise the duration of the transmission, and/or the fault rate, and/or the duration of data processing operations of the individual computer units and/or the individual users prior to the transmission of the data.

It is thus possible to store the data for executing the computer game in a redundant manner also as a function of the determined prespecified parameters of the data transmission between the computer units and the users which are connected therewith.

Furthermore, the computer units can receive control data for executing the computer game from the respective users in order to enable improved interactions of the individual users.

This control data or equivalent data can then be output by the computer units to the data storage means. In this manner it becomes possible that the computer units process data for executing the computer game, depending on the control data, and/or the data storage means process data for executing the computer game, depending on the control data or on data equivalent to the control data, whereby a more efficient data access and a more efficient data management is achieved.

Similarly, with a method of the present invention, data is stored in a redundant manner in at least two of at least two data storage means depending on determined parameters of the data transmission between the data storage means and computer units, with the access to the stored data by the computer units being effected as a function of the determined parameters of the data transmission.

The data access and the data management are preferably controlled by the data storage means.

In an embodiment of the inventive method the redundantly stored data are copied among each other by the data storage means as a function of the determined parameters of data transmissions between the individual data storage means and the computer unit and deleted in the data storage means in which the copied data has been stored beforehand.

In addition, it is possible to process the stored data by the data storage means independent of the computer unit in order to relieve individual means and to achieve a higher reliability of the inventive method.

In order to achieve an application-specific and thus optimised storage of the data can be divided into data subsets, with the data subsets to be stored in a redundant manner being stored in cells of the individual data storage means. Preferably, the division into data subsets and the storage in cells is carried out as a function of the data transmission parameters.

A further optimisation can be obtained if additional data for data access and data management is stored in the cells, which relate to the parameters of data transmissions between the individual data storage means and the computer unit, and/or neighbouring cells, and/or cells which comprise the data redundantly stored in the system.

Moreover, additional data for data access and data management can be exchanged between the cells of the data storage means. Preferably, the access to data of cells of a data storage means has identical data transmission parameters in order to ensure a consistent data access for the individual data storage means.

For the relief of the entire system it is also possible that the computer unit outputs data for storage in the data storage means and/or the data stored in the data storage means is processed by the computer unit.

The data is preferably transmitted by the computer unit to a user and/or the computer unit is controlled by the user in order to process data independent of the execution of the inventive method and to additionally control the sequence of the inventive method. The inventive method is thus capable of providing Internet services.

In order to achieve a more efficient data access and a more efficient data management, the access can also be made directly to the data of individual cells of the data storage means.

Further it is to be preferred that the determination of the prespecified parameters of data transmissions between the individual data storage means and the computer unit comprises the determination of the duration of the transmission, and/or the fault rate, and/or the duration of data processing operations of the individual data storage means prior to the transmission of the data in order to access data more rapidly and/or reliably.

In this manner it is possible to provide a method for a database system or a computer structure as well as a method for an Internet computer game wherein in the latter case the access to data in the data storage means preferably comprises the employment of an Internet service provider.

Moreover, the method can enable at least two users to access the computer game, with the computer game being an interactive computer game.

The data for executing the computer game from the computer units can be transmitted to the respective users. Preferably, the data received by the users are processed by the users and transmitted back to the corresponding computer units in order to relieve the computer units and the data storage means and to optimise the execution of the computer game.

In another embodiment, prespecified parameters of the data transmission between the computer units and the respective users connected therewith are determined in addition, in order to carry out the data access and the data management with the inventive method also under consideration of these parameters.

It is further to be preferred, that the determination of the prespecified parameters of data transmissions between the computer units and the users which are connected therewith comprises the determination of the duration of the transmission, and/or the fault rate, and/or the duration of data processing operations of the individual computer units and/or the individual users prior to the transmission of the data.

In this manner the redundant storage of the data for the execution of the computer game can also be carried out as a function of the determined prespecified parameters of the data transmission between the computer units and the respective users connected therewith.

A more efficient execution of interactive operations of the computer game can be achieved if control data for the execution of the computer game is additionally transmitted by the users to the corresponding computer units. Preferably, the control data or equivalent data from the computer units is also transmitted to the data storage means.

Finally, it is possible to process the data for executing the computer game as a function of the control data from the computer units and/or to process the data for executing the computer game as a function of the control data or the data equivalent to the control data from the data storage means. In this manner, the individual users are relieved and the redundantly stored data is processed by the data storage means which ensure a desired data transmission.

By an inventive replacement of individual failed cells it is possible to compensate for connection errors and in the case of a failure of individual areas of a distributed networked computer structure to utilise areas which retain the functionality of the entire computer structure, in that data is present in the computer system in a redundant manner. Due to the fact that the invention allows for monitoring the used data, the consistency of the available data is also ensured in this manner.

Furthermore, the use of the present invention automatically optimises the connection quality between clients and data providing means of a computer structure so that poor transmission qualities (e.g. low transmission rate, lags, . . . ) are automatically compensated.

For this purpose, individual area of a distributed networked computer system, e.g. individual memory areas, are scaled without interruption of the operation. This means that such individual area of the inventive system can be added or removed at any time.

The present invention also enables to replace individual failed areas of a distributed networked computer system by other areas without interruption of the operation. This is possible because the invention does not require a central connection between individual areas of the computer system, which prevents limitations of the functionality of the inventive system due to failures (e.g. technical defects). In addition, the invention ensures a higher data integrity because the data is not stored centrally.

It is also possible to reduce the quantity of the data to be managed by individual areas of a networked distributed computer system in this manner. The consequence of this is that the required transmission capacities between individual areas of the inventive system can be reduced, too.

Moreover, further components can be added to the inventive system without having to modify its principal structure.

The inventive approach did in fact originate in particular in the solution of the above mentioned problems in the realisation of (interactive) computer games for the Internet. However, it must explicitly be emphasised that the present invention is not limited to such applications, but can be employed for any computer system and any computer structure utilising distributed networked means which provide data.

IN THE DRAWINGS

DETAILED DESCRIPTION OF THE PREFERRED EMBODIMENT

Figure 1:
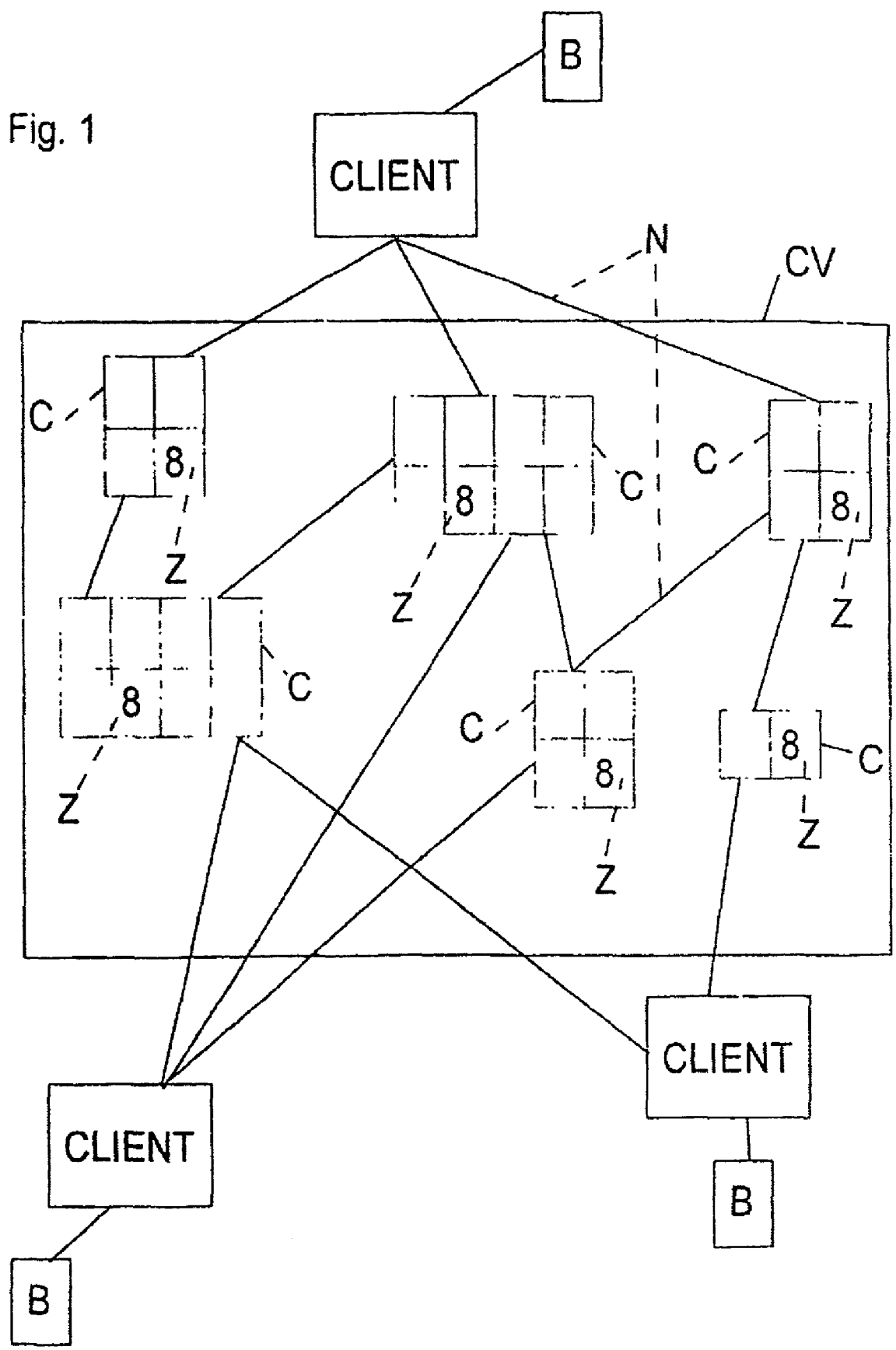
FIG. 1 is a schematic representation of a preferred embodiment of a computer structure according to the present invention.

The terms used in the following text will now be explained with reference to FIGS. 1 and 2.

The entire data quantity GD which is used in the context of the invention is divided into individual data subsets which are referred to as field F.

The position of each field F in the entire data quantity GD is described by a unique field position or identification FeldIF (fieldID), with the entire data quantity GD being capable of being divided one or multi-dimensionally. If, for example, the entire data quantity GD is divided three-dimensionally, each field position FeldID can be described by x, y, z.

A cell Z is the smallest unit for data storage which stores exactly one field F. A cell Z also contains other information which will be covered in detail later.

A cluster C comprises one cell Z or is an accumulation of several cells Z. A cluster C can, for example, be formed by an individual computer or an integrated circuit which manages individual or several cells Z. Moreover, a cluster C can operate as a higher-level control unit for the cells Z contained in it.

All clusters C which are combined for the representation of the entire data stock GD form a cluster pool or a cluster compound CV. The individual clusters C are connected via a network N, with each cluster C having a unique address. A cluster compound CV can thus be formed by networking individual computers forming clusters and/or by connecting individual integrated circuits forming clusters.

Within the cluster compound each cluster is identified by a unique identification ClusterID which can be a single number or a tuple. Individual clusters in the compound contain a table of their neighbours (neighbour table) in order to be able to relay certain messages to certain clusters. In this context, a neighbour is another cluster with a next higher or lower identification ClusterID. The number of cells Z which belong to a cluster can vary between 0 and an upper limit maxcc, where maxcc can be different for each cluster C in the cluster compount CV. The number of cells Z which are actually included in a cluster C is indicated as ncc. In addition, each cell Z has a unique identification ZellID (cellID) within a cluster C.

Moreover, cells Z of a cluster C can exchange information among each other without sending messages via the network N, which enables a reliable message transmission within a cluster C. In addition, it is to be preferred that all cells Z of a cluster C are provided with the same connection quality, i.e. though the connection to the network N can be different between the individual clusters C, it is the same for all cells Z of a cluster C.

As described, a cluster C comprises between 0 and maxcc cells Z. Each memory location of a cluster C which can store a cell Z is referred to as slot S. A slot S can be full, i.e. it stores the data of a cell Z, or empty, i.e. it represents no cell Z. Therefore, the clusters C from FIG. 2 comprise only one full slot S each. The identification SlotID of each slot S corresponds to the identification ZellID which a cell Z would be assigned in this memory location.

A client CL (e.g. Internet provider, personal computer, network computer, and the like) is a unit communicating via the network N which requests data, processes data and/or orders to store the modified data. In the present invention, no assumption whatsoever concerning the actual realisation of the network N is made. As network N any means which transmit data can be employed, such as e.g. proprietary busses, local networks, or the Internet. The invention does also not assume that the network N ensures the transmission of all data, so that acknowledgements concerning a data transmission to the respective sender are not required, and that the network N transmits data according to its sending time.

Figure 2:
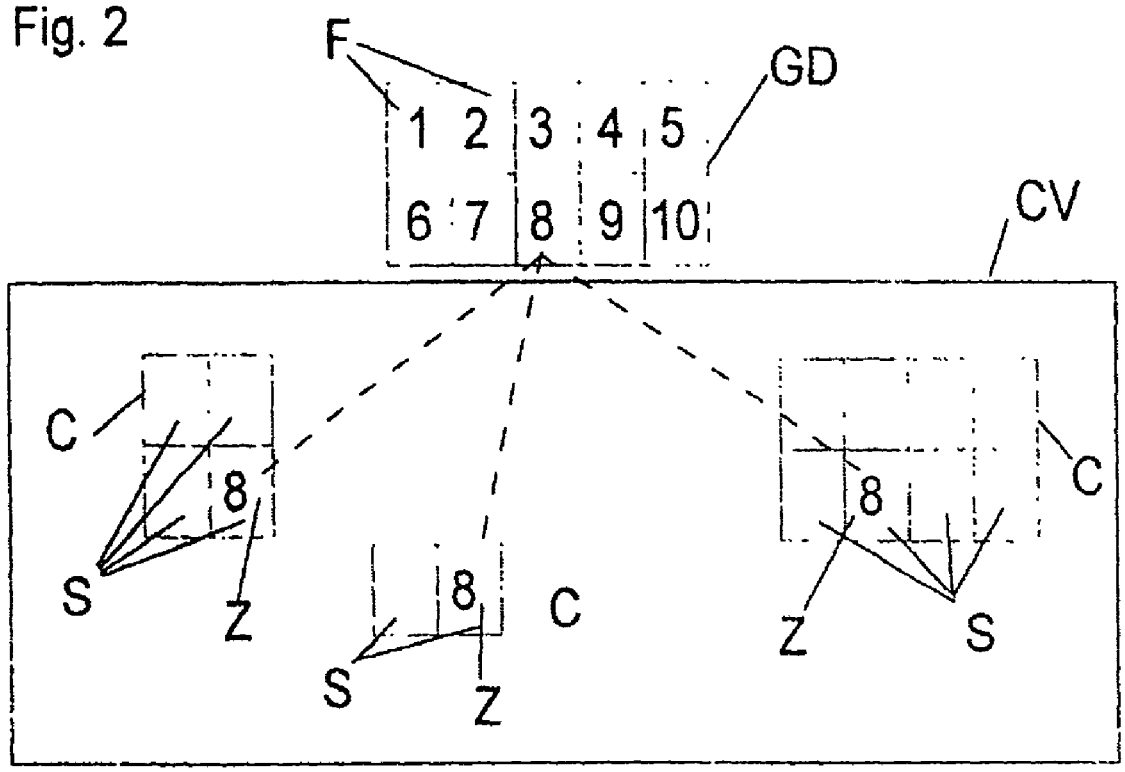
FIG. 2 shows a schematic representation of a data structure as well as its division and assignment to cells according to the present invention.

As will be presented in the following and is shown in FIG. 2, the invention is based, among other things, on a distribution of the entire data GD or the fields F, respectively, to several cells Z of identical contents, i.e. a single field F is stored in several cells Z in a redundant manner. The Number of cells Z which store and manage a certain field F is specified as nm and is the same throughout the entire cluster compound CV, with each of the nm cells Z being referred to as mirror SP for the field F which is stored in the nm cells Z. In the following explanation of the invention nm=3 is assumed, with this value serving only for illustrating the invention and to be specifically selected for each application case.

A response AK is the response to a request RQ. The contents and function of the individual requests RQ and responses AK depends on the transmitted data.

A message MSG is a data quantity which is exchanged between cells Z, clusters C and clients CL. It is the task of the network N to transmit the messages MSG. Due to the fact that the sender of a message MSG does not receive an acknowledgement of a successful transmission, messages MSG can get lost. It is also possible that two messages MSG arrive at a destination after different times. Now the principal procedure with the present invention and individual actions or operations, respectively, for carrying out the invention will be described.

The entire data quantity is divided into individual fields F. Such a division can, for example, be effected two-dimensionally or three-dimensionally. For example, a chessboard could be divided into 8*8 fields F, with each field F containing the information on the respective chessboard square, e.g. which chess piece is located there. Analogously, a three-dimensional space, too, can be represented by fields F. It is also possible, however, to divide an image into individual image areas or a text into individual words or character(s) (strings) which are assigned to individual fields F. The contents of the fields F is application-specific and is not relevant in the present invention. The individual fields F are then stored in nm cells Z, with each cell Z storing a corresponding field F, i.e. the actual data, as well as further information which preferably relates to references to neighbouring fields F. This information permits a data reduction because in this manner, "empty" fields F need not be stored and not each field F must be assigned a cell Z.

Several cells Z are then combined to a cluster C, and all clusters C in turn are combined to a cluster compound CV. An essential characteristic of the invention is that each cell in the cluster compound CV is available in a redundant manner, i.e. nm times in nm clusters C. Thus, each field F is nm times stored in these cells Z, and each of these cells Z is referred to as mirror SP with respect to the field F stored therein. In addition, each cell Z contains information in which clusters C and/or in which cells Z of the corresponding clusters C the other nm−1 cells Z are located.

In addition, each cell Z contains further information which preferably comprises indications on the data transmission quality in the cluster compound CV and with respect to the clients CL, e.g. transmission quality, transmission rate, and the like. This information is updated when the cells Z are accessed.

In order to receive the contents of a field F, a client CL sends a request via the network N to all cells Z and/or clusters C, which include the desired field F, i.e. to all cells Z which are mirrors SP of the desired field F. It depends on the parameters of the data transmissions to the individual cells Z and/or clusters C as well as back to the clients CL, from which cell Z or which cluster C the requesting client CL will receive a response. Preferably, the requesting client CL receives a response from the cell Z and/or the cluster C, which realise the fastest data transmission at the respective time and/or which are capable of carrying out a processing of the data more rapidly prior to its sending to the requesting client CL.

All cells Z and/or clusters C and/or clients CL periodically check their applicable parameters for data transmissions. In periodic intervals or subsequently to specified actions, all cells Z and/or clusters C and/or clients CL check the parameters for data transmissions, which are applicable to the used cells Z. If the checked parameters do not meet specified limits, or if other cells Z and/or clusters C comprise better data transmission parameters, the checking cells Z will try to shift its data to these other cells Z and/or clusters C in order to improve the data transmission parameters applicable for this data. In this manner, the inventive cluster compound CV optimises itself automatically during operation with respect to data transmissions.

Certain requests of a client CL, such as e.g. a write request WriteRQ as described below are synchronised between all mirrors SP of the respective field F. In this manner, failed mirrors SP are identified. In addition, extra checks are carried out at periodic intervals and/or by clients CL after the receipt of responses AK. This, too, identifies failed mirrors SP and/or mirrors which are no longer relevant. These mirrors SP are either replaced by other mirrors SP, or a cell Z or a cluster C or a client CL substitutionally generates new mirrors SP, or the present defects are remedied by means of methods described below. In this manner, the cluster compound CV is fault tolerant against the failure of individual cells Z and/or whole clusters C.

In addition, requesting clients CL can assign individual cells Z and/or clusters C special processing functions which are executed independent of the mode of operation of the clients CL. A client CL, for example, can instruct a cell Z or a cluster C to change the data of a field F in certain intervals. This characteristic is of particular importance if the present invention is employed in connection with computer games which are executed under real-time conditions via a network, e.g. the Internet, in order to reduce the data quantities to be transmitted and to optimise the interactive operations in the execution of a computer game.

Figure 3:
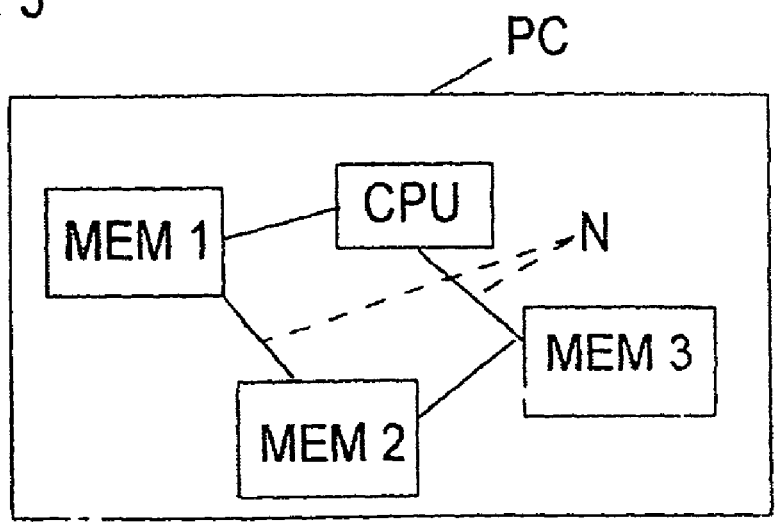
FIG. 3 is a schematic representation of another preferred embodiment of a computer structure according to the present invention.

Data between the individual clients CL, clusters C, and cells Z are transmitted by using a certain protocol. This means that in addition to the transmitted data, further prespecified data are sent and received by the individual clients CL, clusters C, and cells Z in order to initiate desired operations or to react in a desired manner as described below. AU clients CL, clusters C, and cells Z carry out the necessary operations in order to achieve the desired functionality of the corresponding cluster compound CV. If the invention is employed as shown in FIG. 1 for providing computer games via the Internet, then the network N is the Internet and the client CL is the computer system which operates as Internet provider. The individual clusters C comprise memory units of the client CL and storage means of other computer systems which are distributed over the computer system. Due to the fact that generally only one connection exists between a client CL (Internet service provider) and a corresponding user B, usually via a telephone line, the user B and the client CL (Internet provider) form a system to be regarded as consistent at that time. For this reason, the user B from FIG. 1 is not shown in FIG. 4. An inventive optimisation of the data transmission to the users B were possible only if the user B had a simultaneous access to different Internet providers. With the current state of the art, the present invention permits an optimisation of the data management and transmission for clients CL operating as Internet providers if these access e.g. the data required for an interactive computer game, with several players via the Internet in accessing other computer systems operating as clusters. As shown in FIG. 3, the invention can also be employed in a consistent computer structure such as in a personal computer PC. In this case, the central processing unit CPU operates as client and the various data managing means MEM1, MEM2, MEM3 operate as clusters. The data managing means MEM1, MEM2, MEM3 can be conventional storage means, e.g. non-volatile memories or random access memories, but also special means which e.g. do not only store but also process data and which can therefore not provide the central processing unit CPU with data without restrictions and at any time.

A cell Z can assume five states, with each status being always possible because the cells Z are not fault tolerant and the network N does not ensure and check data transmissions.

Active status (active): The contents of the cell Z are valid and the cell Z is ready for operation.

Invalid status (invalid): The cell Z is ready for operation but its contents are no longer current and valid. This can occur, for example, if the cell Z has not carried out data operations because of a technical defect or because of not received information.

Inactive status (inactive): The cell Z is not available, e.g. because data transmissions to it are permanently lost or because the cell Z has permanently failed.

Blocked status (blocked): The cell Z processes only certain data transmissions, such as e.g. the write requests WriteRQ or read requests ReadRQ described below.

Idle status (idle): The cell Z is ready for operation, but is currently not used in the cluster compound CV.

A cell Z contains a certain field F, i.e. a field F with a certain field position FeldID (fieldID) and has a unique position ZellID (cellID) within the corresponding cluster C. The cluster in turn is identified by a unique identification with the form ClusterID:ZellID. Each cluster C and each client CL is uniquely identified in the cluster compound CV by an identification ClusterID, ClientID, respectively. No particular requirement are placed on these identifications, they only have to provide for a unique identification of the cluster C and the clients CL.

In the following, a number of algorithms will be described in more detail which are utilised by the functional operations described further below which serve for the execution of the invention. This explanation is supplemented by corresponding pseudocodes which are used in the currently preferred embodiment of the invention.

In order to be able to assign messages MSG, i.e. data transmissions in a unique manner to individual operations, each message MSG is given a ticket number TNr which is generated upon sending. As long as the respective operation is not completed, all clients CL, cells Z, and clusters C involved can associate the message MSG with the corresponding operation by the ticket number TNr in a unique manner. For obtaining unique ticket numbers TNr, a ticket number TNr can, for example, be combined by the sending time of the message (or from a continuous counter generated in the cell) and the sender's identification. Due to the fact that the sender's identification is unique and the sending times of two messages MSG are different, each message MSG can be assigned the respective operation in a unique manner. Unique ticket numbers TNr, however, can be generated depending on the most different applications of the invention in other ways.

Pseudocode for the Generation of a Ticket Number TNR:
function makeNewTicket:longword;
begin
a:=laufender_zaehler; (continuous counter)
inc(laufender_zaehler); (continuous counter)
b:=own_adress;

makeNewTicket:=<combination from a and b, e.g. by shifting>
end;

If a cluster C receives a message MSG which is destined for another cluster C, i.e. the ClusterID of the destination address of the message MSG does not correspond to the address of the receiving cluster C, then the receiving cluster C relays the message MSG to the cluster C for which the message MSG is intended. The way in which the message MSG is relayed depends on the actual realisation of the network N, and/or the clusters C, and/or the clients CL, and/or the data transmission protocol, and/or corresponding data included in the message MSG. A message MSG is also relayed if a cell Z receives the message MSG which is intended for another cell Z.

Each cell Z contains information on neighbouring cells Z and, on the basis of this information, checks whether a desired cell Z is located within the current cluster C. If this is not the case, preferably the cell Z is selected from all neighbouring cells Z of the current cluster C which is the most neighbouring cell with respect to the cell Z. If several cells Z meet this requirement, a cell Z can be selected at random.

Optionally, with each relay of a message MSG a step counter may be incremented by one step. With each step, the respective cluster C sends a holding response HalteAK (holdingAK) to the sender of the message MSG in order to inform same that his request RQ is still being processed. If the sender does not receive such a holding response HalteAK in this case, then the sender can assume that its message MSG has been lost. The sender can then direct its message MSG e.g. to the last cluster C which has sent the last received holding response HalteAK.

There is no reliable method for transmitting messages MSG and for ensuring that the messages MSG have been received because the network N need not guarantee data transmissions so that messages MSG (e.g. requests RQ and responses AK) can get lost any time.

In order to ensure a higher degree of reliability of the transmission of certain data, a pseudoreliable message PSM can be used. In this case, the pseudoreliable message PSM is sent repeatedly until a loss of the message is improbable. Only then it is assumed that the transmission has failed.

If one assumes a probability of 1/n with which any message MSG can get lost, then a pseudoreliable message PSM must be sent x times so that the probability $p=(2/n)^x$ with which the message has been lost is sufficiently small. With a missing response AK it can then be assumed that the recipient has failed.

Pseudocode for Sending a Pseudoreliable Message PSM:
```
procedure psm_send(message:TCellMsg; d1,d2,d3:Tadr;
next_status:TCellStatus);
  var i:byte;
  begin
  //the psm_variables are temporary variables of the
  //respective cell
  psm_timeout:=false;
  psm_nextstatus:=nextstatus;
  psm_ticket:=message.ticket;
  psm_num:=num;
  psm_dest[1]:=d1;
  psm_dest[2]:=d2;
  psm_dest[3]:=d3;
  for <all present i> do begin
    psm_received[i]:=false;
    psm_sendtime[i]:=curr_time;
    psm_nrSended[i]:=0;
  end;
  <complete further fields of the message, if applicable>
  psm_m:=message;
  message.dest=d1; send(message);
  message.dest=d2; send(message);
  message.dest=d3; send(message);
  status:=cs_psm_waiting;
end;
```

In order to check whether a cell is waiting for the acknowledgement of a pseudoreliable message PSM, the following pseudocode is used:
```
<process if cell waits for PSM input>
begin
if (status=cs_psm_waiting) and (message is Aknowledge)
then begin
    if message.ticket<>psm_ticket then exit;
    sender:=psm_destination(message);
    //check if ak_hold
    if (sender<>0) and (message.command=ak_hold) then
      begin
        <extend waiting time>
        exit;
      end;
end;
if sender<>0 then begin
    //note message in psm_MsgIn[sender]
    psm_msgIn[sender]:=message;
    psm_received[sender]:=true;
    exit;
end; //status=cs_psm_waiting
end;
```

The corresponding cell Z must check whether all responses AK have been received when it executes its update procedure. The corresponding status (cs_psm_waiting) must be processed there. It must then be decided whether all responses AK have been received and, if not, if waiting is to be continued:
```
procedure update;
...
case status of:
<processing of other status values>
cs_psm_waiting:
  begin
    if <response to all RQs received>
    begin
      status:=psm_next_status;
      exit;
    end;
    <check here for timeout, and if required, resend
    one or several PSM requests>
    //check for timeout of all cells
    if <waiting time for addressees elapsed> then
    begin
      status:=psm_nextstatus;
      psm_timeout:=true;
    end;
  end;
...
end;
```

The self check is the central operation in order to ensure the consistency of all mirrors SP of a compound for a field F. A self check is initiated by a requesting third party, e.g. a client CL or a cluster C. A mirror SP which carries out a self check causes that the other mirrors SP of the compound also carry out a self check. A self check by a mirror SP can result in a fault correction by this mirror or another mirror SP. Depending on how unreliable the network actually is (loss of messages, lags), it may be impractical to make the PMS virtually reliable. The individual operations (such as adding a new mirror, etc.) should be fault tolerant to a certain degree. The case that a message, though classified as not delivered, is delivered nevertheless is very improbable with PMS but not impossible. Therefore corresponding fault corrections must be provided.

If a mirrors SP receives a self check request SelbsttestRQ (self checkRQ), it begins a self check under the same ticket number TNr, provided it is not just carrying out a self check which has been initialised by another self check request SelbsttestRQ and if the ticket number TNr of the currently received self check request SelbsttestRQ differs from the last received check request SelbsttestRQ.

If a requesting third part sends a read request LeseRQ (readRQ) described below, the execution of a self check is necessary only if the requesting third party receives inconsistent responses AK from the corresponding mirrors SP of a field F which the requesting third party intends to read.

The requesting third party compares the responses AK received from the mirrors SP and—under the assumption of the above described three mirrors SP for one field F—with three responses AK accepts the result. With two response AK it initiates a self check and accepts the result. With only one response AK it initiates a self check and rejects the result.

If a self check request SelbsttestRQ has been received or a self check has been initiated by other system-related default, e.g. timeout, the corresponding mirror SP must check its own validity and is either responsible for the fault correction itself or instructs another mirror SP to perform the fault correction. In the selection of a mirror SP for the fault correction it is to be attempted that always only one mirror SP carries out the fault correction, even if several mirrors SP perform a self check quasi simultaneously, in order to avoid inconsistent conditions.

In this context, the mirror SP sends a validation request ValidierRQ (validationRQ) to all other mirrors SP. The exchange of the corresponding data is done by using pseudoreliable messages PSM. If no response AK is received, the destination is declared unavailable. The failed mirror SP is then replaced by a new one.

Pseudocode for Carrying Out a Self Check SelbsttestRQ:
A mirror starts a self check if it receives a corresponding message:

```
rq_start_selfCheck:
begin
   if not used then exit;
   if (status<>cs_idle) then begin
      return_msg(m,ak_busy);
      exit;
   end;
   start_selfcheck;
   exit;
end;
```

Alternatively or supplementary the self check can also be carried out automatically at certain intervals. For this purpose, the checking mirror SP sends a corresponding request to all other mirrors SP:

```
procedure start_selfCheck;
var m:TCellMsg;
begin
   <Optional: last_intervall_selfcheck:=current_time>
   m.cmd:=rq_validate;
   m.lifecount:=lifeCount;
   m.data:=data;
   m.ticket:=makeNewTicket;
   psm_send(m,mirror[1 ... nm−1],cs_selfCheck_check);
end;
```

Each cell Z must be capable of responding to validation requests:

```
rq_validate:
begin
   if not used then begin
      if <cell just becomes mirror> and
         <request from future mirror> then
         return_msg(m,ak_valid);
         exit;
      end;
      return_msg(m,ak_noMirror);
      exit;
   end;
   if message_is_from_mirror(m) then
   begin
      <enter own mirrors in message>
      if message.lifeCount=lifeCount
         then return_msg(m,ak_valid)
         else if m.lifeCount>lifeCount then
            begin
               lifeCount=m.lifeCount;
               <take data from message>
               return_msg(m,ak_valid);
            end
         else return_msg(m,ak_invalidLC);
   end
   else return_msg(m,ak_noMirror);
   exit;
end;
```

After the checking cell Z has either received all responses AK or the time has elapsed, it reviews the result of the self check:

```
procedure do_final_selfCheck;
var i:integer;
m:tcellmsg;
s:string;
begin
   sc_res:=' ';
   for i:=1 to nm−1 do begin
      if (not psm_received[i]) then begin
         sc_res[i]:=' ';
         psm_msgIn[i].cmd:=rq_none;
      end else begin
         case psm_msgIn[i].cmd of
            ak_valid: sc_res[i]:='V';
            ak_invalidLC: sc_res[i]:='D';
            ak_noMirror: sc_res[i]:='I';
         end;
      end;
   end;
   //review result now:
   if sc_res='VV' then begin
      status:=cs_idle;
      <further initialisations after completed self check>
      exit;
   end;
   if (sc_res='VD') or (sc_res='DV') then begin
      <take over data from D sender>
      status:=cs_idle;
      <further initialisations after completed self check>
      exit;
   end;
   if (sc_res='DD') then begin
      <take over data from D sender>
      status:=cs_idle;
      exit;
   end;
   if (sc_res='VI') or (sc_res='IV') or
      (sc_res='DI') or (sc_res='ID') or
```

```
(sc_res='V') or (sc_res='V') or
  (sc_res='D') or (sc_res='D')
then begin
  <further checks, if required>
  if (sc_res[1]='D') or (sc_res[2]='D')
    then <take over data from D sender>
  <Set: no response='D'>
  if <this mirror is responsible> then
    <find a new mirror>
  else
    <send order to find a new mirror to responsible mir-
      ror>
  exit;
end;
if (sc_res='11') then begin
  <initialise cell>
  used:=false;
  exit;
end;
if (sc_res='I') or (sc_res='I') then begin
  status:=cs_idle;
  exit;
end;
if (sc_res=' ') then begin
  <optional: find nm-1 new mirrors>
  status:=cs_idle;
  exit;
end;
end;
```

Assuming a mirror compound of three mirrors SP, the following cases can be distinguished for the receipt of no, one, or two responses AK at the mirror SP which sends the validation requests ValidierRQ (validateRQ) to the two other mirrors SP of the compound, which are listed in the table below, with the incoming responses AK being classified as follows:

"V" (valid): The sending mirror SP accepts the receiving cell Z as mirror SP, and the life counters of the sender and the recipient have the same value.

"D" (delayed): The sending mirror SP accepts the receiving cell Z as mirror SP, but the life counter of the sender has a lower value than the life counter of the recipient.

"I" (invalid): The sending mirror SP does not accept the receiving cell Z as mirror SP.

| Case | Incoming responses AK | Status of mirror compound |
|---|---|---|
| 1) | VV | Both receiving mirrors SP are valid: The mirrors of the compound have consistent and current data so that no further operations become necessary. |
| 2) | VD | The requested mirror SP sending a "V" is valid and the requested mirror SP sending a "D" has a higher life counter value. The requesting mirrors SP must take over the data of the requested mirror SP sending a "D". |
| 3) | DD | Both receiving mirrors SP have life counters with higher values: The sending mirror SP is invalid and must take over the data of the mirror SP sending a "D". |
| 4) | VI | a) The requested mirror SP sending a "V" receives an "I" from the requested mirror SP sending an "I": The requesting mirror SP and the requested mirror sending a "V" are valid, the requested mirror sending an "I" is invalid and is to be removed from the compound. The mirror SP with the lowest index must find a new mirror SP. b) The requested mirror SP sending a "V" receives a "V" from the requested mirror SP sending an "I": The requested mirror SP sending an "I" is inconsistent and must be removed from the group (see detailed explanation in the following). The mirror SP with the lowest index must find a new mirror SP. |
| 5) | DI | The requesting mirror SP takes over the data of the mirror SP sending a "D". Otherwise the procedure corresponds to case (4). |
| 6) | II | The requesting mirror SP is in the minority and is declared invalid. |
| 7) | V- | A requested mirror cannot transmit data: The mirrors SP of the two working mirrors SP with the lower index must find a new mirror SP. The failed mirror SP is treated like to mirror SP sending an "I" in cases (4) and (5). |
| 8) | D- | One requested mirror cannot transmit data and the other requested mirror SP has a life counter with a higher value: The requesting mirror SP takes over the data from the working requested mirror SP, and the mirror SP with the lower index must find a new mirror SP. The failed mirror SP is treated like to mirror SP sending an "I" in cases (4) and (5). |
| 9) | I- | One requested mirror SP is invalid and the other requested mirror SP has failed: The requesting mirror SP is in the minority, remains active, but does not find new mirrors SP. |
| 10) | -- | Both requested mirrors SP do not transmit data or the network connection of the requesting mirror has failed: Alternative 1: The requesting mirror SP remains active, but does not find new mirrors SP. Alternative 2: The requesting mirror ensures by additional checks that its connection functions properly and replaces the two mirrors. The two requested mirrors SP do not receive any information to this effect and will later exclude the requesting mirror SP. This case must be compensated by the operation DoubleFieldCheck described below. |

In those cases in which a new mirror SP is to be found, a new mirror SP is found by one of the remaining mirrors SP, with only one mirror being allowed to do this task. A mirror must be selected, e.g. the one with the lower index. The other mirror SP with the higher index does not execute any operations, but will receive messages MSG after some time which indicate the integration of a new mirror SP into the compound.

If a mirror SP has physically failed, it is either possible that no requests RQ were made to the mirror compound in the meantime, i.e. that its failure has not been noticed and has not brought about any impacts, or that the two other mirrors SP have declared it invalid in the meantime and found a replacement mirror. If a restart operation is carried out, such a condition can be determined. For this purpose, the starting mirror SP carries out a self check as previously described.

In the present invention the life counter is a counter which is incremented by integer values. In order to prevent an overflow of the life counter the life counter of all clients CL, cells Z, and clusters C is periodically adjusted, i.e. set to a lower common value.

For this purpose, the adjustment is initiated from any mirror SP, e.g. from the mirror SP with the lowest life counter value. All mn mirrors SP of a field F wait for the receipt of all nm-1 responses AK (PSM). Only if all nm-1 responses AK are received, the respective mirror SP carries out an adjustment of the life counter.

When adjusting the life counter, attention has to paid that the interval between two adjustments is selected in such a manner that mirrors SP which have been replaced in the meantime do not become valid again upon a restart. Preferably an additional memory is used for this purpose in which the value of the last life counter is stored where a mirror SP has been replaced.

In the case of pseudoreliable messages PSM, too, faults can occur. It is true that the parameters for pseudoreliable messages PSM can be selected in such a manner that faults are improbable to such an extent that they virtually do not occur in the selected application. This can, however, lead to the result that the application is actually no longer practicable. With respect to the parameters for pseudoreliable messages PSM it might be necessary to make compromises so that faults occur due to faulty pseudoreliable messages PSM, which must be corrected.

For this reason, the communication of the cells Z or the mirrors SP, respectively, among each other must be designed in such a manner that these faults remain without consequences or are corrected. This is done, e.g. by the use of a self check SelfCheck.

The operation DoubleFieldCheck described in this section serves to correct faults which have been caused by communication errors with pseudoreliable messages PSM. Such faults cause mirror compounds to duplicate, i.e. that more than nm mirrors exist for one field.

The operation DoubleFieldCheck can be carried by one or more mirrors SP in an interval t_DoubleFieldCheck. Each client CL can initiate an operation DoubleFieldCheck if it receives responses AK from mirrors SP whose references to other mirrors SP are not consistent.

The operation DoubleFieldCheck removes additionally generated mirror compounds in order to restore the desired condition of nm mirrors SP per one field F. For this purpose, a manager for the operation DoubleFieldCheck is selected. This can be any cell Z (also of the mirror compound) or a client CL (e.g. the client which detected the error situation). Optionally, the manager sends a request RQ to the network to which all cells Z respond which are responsible for a certain field F, whereby also additional mirror compounds are detected. The manager then decides which cells Z belong to the valid mirror compound and sends a delete request DeleteRQ to all other cells Z. Optionally, the manager sends a request rq_updateTable to all remaining mirrors SP for updating their mirror tables.

If individual cells Z do not receive the delete request DeleteRQ, they will be deactivated upon the next self check SelfCheck and/or the next operation DoubleFieldCheck.

In order to decide which cells Z belong to the valid mirror compound various algorithms can be employed. In the following, examples for this are shown which can also be combined.

One possibility is to introduce a generation counter which is incremented each time a new mirror SP is added to the compound. In the case of mirrors SP with a doubly existing index, the mirror SP with the higher/lower generation counter will be removed. It is also possible to declare the mirror compound valid which was last write-accessed. Furthermore, the validity of a mirror compound can also be decided as a function of any other properties (e.g. geographic position of mirrors SP). If only one single mirror SP is detected as working properly e.g. by a client CL, it is possible that the error is with this mirror SP and not with the nm−1 other mirrors SP. In order to exclude this possibility, an additional safety check should be carried out for ensuring the correct function of the single mirror SP before same replaces the other mirrors SP. It is thereby prevented that the single operating mirror SP erroneously activates additional mirrors SP.

With actually only one mirror SP still working, nm−1 new mirrors SP are to be added. First, the working mirror SP must check or ensure, respectively, the function of its own data transmissions. Then nm−1 new mirrors SP are requested by a request rq_needNewCells. All nm−1 new mirrors SP are sent a request to become mirrors. It is thereby not necessary to evaluate the responses AK immediately, because any faults will be corrected by later self checks SelfChecks (this sequence approximately corresponds to the addition of a new field F, with the difference that only nm−1 cells Z are found and that the mirror manager in this case is identical with a mirror SP).

In the following sections the data exchange between clients CL, cells Z, and clusters C is described which is preferred for providing the inventive "active" cells. In particular, the following operations are employed with reference now being made to FIG. 4:

Find operation (find): Finding of a cell Z which includes a desired field F.

Read operation (read): A client CL reads the contents of a field F from a mirror SP.

Write operation (write): A client modifies the contents of a field F in all associated mirrors SP.

Add operation (add): Adding of fields F which previously have not been in the cluster compound CV.

Delete operation (delete): Deletion of a field F in the cluster compound CV.

By sending a find request FindRQ a client CL determines the position of the cells Z which include a desired field F and are thus mirrors SP for the desired field F. The addresses of these cells Z include both the identifications ClusterID of the corresponding clusters C as well as the identifications ZellID of the cells Z themselves.

Figure 4:
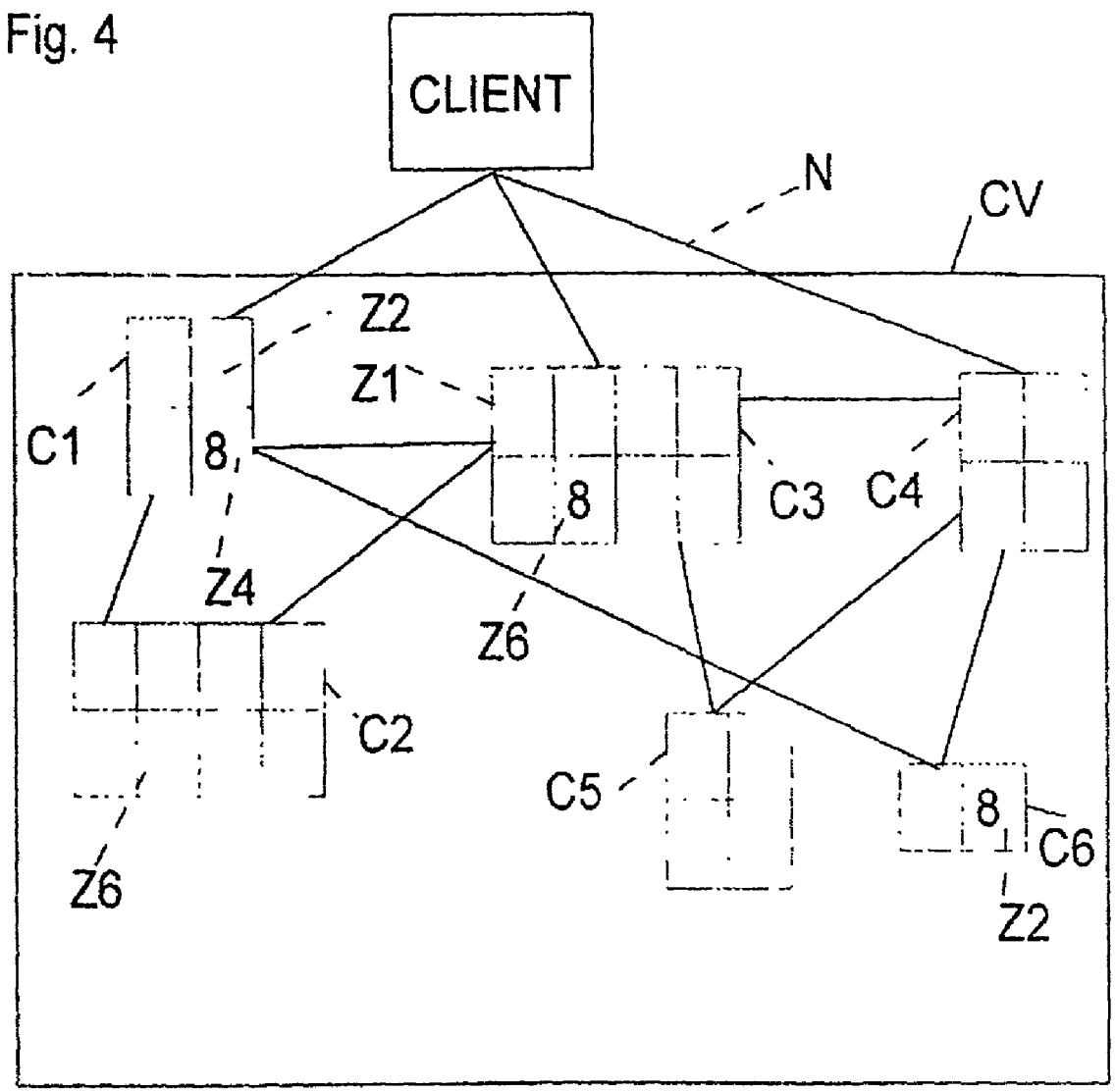
FIG. 4 is a schematic representation of a section of the preferred embodiment of FIG. 1 for the explanation of operations, which are used for executing the invention.

For obtaining the addresses of the cells Z which are mirrors SP for the desired field F (e.g. field F8 from FIG. 2), the client CL requests any cluster C, e.g. cluster C6, whether one of its cells Z includes the desired field F8. If this is the case than the cluster C6 sends the corresponding cell identification ZellID as well as the cluster identifications ClusterID of all nm−1 cluster C which include mirrors SP of the desired field F8. As shown in FIG. 4, in this case these are the cell C4 in cluster C1 and the cell Z6 in cluster C3, i.e. in total the cells with the identifications ZellID C1Z4, C3Z6, and C6Z2.

If the requested cluster C, e.g. cluster C4, does not contain the desired field F8, the requested cluster C4 finds the cell Z among the cells Z included therein whose field position FeldID comes closest to the field position FeldID of the desired field F8. For this purpose, the cluster C can, for example, determine the sum of the absolute values of the difference between the cell position ZellID and all other neighbouring cell positions ZellID in order to select the cell Z where the absolute value of such a difference is minimal.

Due to the fact that cells Z contain information on neighbouring cells a cluster C can be found in this manner which comprises a cell Z with the desired field F8. The cluster C4 requested by the client CL relays the find request FindRQ to the cluster C found in this manner, e.g. to cluster C6. This operation is repeated until a desired cell Z has been found or until cells Z are not longer found which are neighbouring cells of the desired cell Z. Preferably, a step counter in incremented upon the relay of a find request FindRQ. With each increase of the step counter, the respective current cluster C sends a holding response HalteAK (holdingAK) to the client CL in order to inform same that his request FindRQ is still being processed. If the requesting client CL does not receive such a holding response HalteAK in this case, then it is to be assumed that its request FindRQ has been lost. In this case it is to be preferred that the requesting client CL directs the request FindRQ to the cluster C again from which it has received the latest holding response HalteAK.

The find request FindRQ is successfully completed if the requesting client CL receives a destination identification ZielID (destinationID) for nm mirrors SP of the field F8. In the example shown in FIG. 4 the destination identification ZielID would comprise the cells C1Z4, C3Z6, and C6Z2. If the client CL does not receive a response AK, the find operation has failed.

In the following, the sequence is described which is executed for read requests ReadRQ and write request WriteRQ. With the read and write requests ReadRQ, WriteRQ, shown below it is necessary that the respective client CL knows the identifications of the mirrors SP which include the field F whose data the client CL wants to access. This is critical insofar as the identifications of the desired mirrors SP can change any time due to shifting of the mirrors SP. To prevent this, it would be basically possible to link each find request FindRQ with an operation LockRQ which prevents changes of the respective compound of the desired mirrors SP before the actual read and write reqeuests ReadRQ, WriteRQ have been received by the desired mirrors SP. This would, however, significantly reduce the efficiency of data transmissions between clients CL and clusters C.

For this reason the approach with the preferred embodiment of the present invention is as follows. A client CL executes a find operation and notices the received positions of the mirrors SP which include the desired field F.

If a mirror SP includes read and write requests ReadRQ, WriteRQ with a field position FeldID for the desired field F, which does not correspond to the field position FeldID for the desired field F in the mirror SP, it informs the client CL accordingly. Furthermore, each mirror SP always or alternatively on request returns the positions of the other nm−1 mirrors SP to the requesting client CL. In this manner, a mirror SP can correct the identifications ID stored in it and, if required, send a new find request FindRQ.

Pseudocode for carrying out a find request FindRQ:
rq_read:
begin
  if not used then
  begin
    <Optional: Return fault message to client>
    exit;
  end;
  message.data:=data;
  //Write own mirrors into the message
  for i:=1 to nm−1 do
    message.mirror[i]:=mirror[i];
  <complete further field>
  <storage of specifications for performance measurement>
  return_msg(m,ak_read);
end;

The request of a client CL is always directed to all nm mirrors SP:
  message.command:=rq_read;
  for i:=1 to nm do begin
  message.destination:=spiegel[i];
  <informationen für performance measurement in message, if req'd.>
  send(message);
  end;

Ideally the client CL buffers its own requests in order to be able to execute further actions (e.g. other requests) in the meantime, until the 1 . . . nm corresponding responses ak_read or a timeout arrives. After the elapse of the waiting time TWLese (TWRead) the client CL must check how many responses have been received and whether the mirror tables of the responses are consistent:
  if nr_al>nm then begin
    <send request for DoubleFieldCheck to all senders>
    exit;
  end;
  if nr_ak=nm then begin
    if <Mirror tables consistent>
      then <use result from any response message[i]>
      else <send request for SelfCheck to all senders>
    exit;
  end;
  if nr_ak>nm div 2 then begin
    if <Mirror tables consistent> then <use result from any response message[i]>
    <send request for SelfCheck to all senders>
    exit;
  end;
  if nr_ak>0 then <send request for SelfCheck to all senders>

Preferably, the read requests ReadRQ and the write requests WriteRQ are sent via the network N to all clusters C in parallel, but depending on the network N used any other type of sending is possible.

Each mirror SP, e.g. the cell C1Z4, optionally relays a read request ReadRQ from a client CL to all other mirrors SP, i.e. to the cells C3Z6 and C6Z2 in this case, and each mirror SP then sends a response AK to the client CL. In this case, a mirror SP receives a further read request ReadRQ and because this has the same ticket number TNr as the previously received read request ReadRQ it will be ignored because this mirror SP has already sent a response AK to the requesting client CL.

When a read operation is executed the client CL requires the data of a certain field F, e.g. F8. For receiving this data the client CL must know the positions of the mirrors SP which are responsible for this field F8. This can be enabled by a previously executed find operation in order to determine the cells C1Z4, C3Z6, and C6Z2 operating as mirrors SP.

The client CL sends a corresponding read request ReadRQ with a unique ticket number TNr to all 3 clusters C1, C3, and C6 which include the mirrors SP which are responsible for the desired field F8.

The client CL waits for a predetermined application-specific time interval TWLese (TWRead) for responses AK of the requested mirrors SP which include the desired data. Each mirror SP acknowledges the read request ReadRQ with a response AK so that nm (i.e. 3 in this case) responses AK arrive at the requesting client CL.

The client CL responds as a function of the type and/or number of the incoming responses AK. With three mirrors SP assumed which are responsible for the field F of the desired data the following different states result. If the client CL receives two or three identical responses AK, the result is used. If it receives two different responses AK or only one response AK the client CL sends a request for a self check to the corresponding mirrors SP. If the client CL receives different responses AK that response AK is used whose life counter has the highest value.

A read request ReadRQ is successful if the client CL receives at least one response AK and cannot be completed successfully if the client CL does not receive a response AK within the predetermined time interval TWLese or if one or several clusters C signal that they did not find the desired cell Z. In order to avoid the above problems in sending a read request ReadRQ it is to be preferred to execute find requests FindRQ and read requests ReadRQ in a combined manner. In this case the client CL directs and find/read request Find/ReadRQ to any cluster C and receives a response AK from same as in the execution of an individual find request FindRQ. Here, the response AK does not include the address ID of the desired field F but the data of the desired field F.

It is to be considered, however, that a combined find/read request Find/ReadRQ compared to an initial find request FindRQ for finding the desired mirrors SP and a subsequent read request RearRQ to the desired mirrors requires more time, because now all clusters C must process the combined and thus more extensive find/read request Find/ReadRQ.

In order to change the data of a field F, e.g. field F8, the client CL sends a write request WriteRQ. As in the case of a read request ReadRQ, the client CL must know the positions of the 3 mirrors SP which are responsible for the desired field F8.

The client CL sends a write request WriteRQ to all 3 mirrors SP of the desired field F8. Thereupon the data of the desired field F8 or of the associated cells C1Z4, C3Z6, and C6Z2 operating as mirrors SP is modified in that all mirrors SP update their data correspondingly. Then each of the mirrors SP returns a response AK to the requesting client CL. As soon as all responses AK of the mirrors SP have arrived at the client CL the write operation is successfully completed.

If at the time at which the client CL sends it write request WriteRQ another write request WriteRQ to the desired cells C1Z4, C3C6, and C6Z2 is already being executed the client CL receives a corresponding response AK which indicates that the write request WriteRQ has failed and the desired cells C1Z4, C3C6, and C6Z2 are in a locked state. A write request WriteRQ has also not been completely successfully if the requesting client CL receives less than nm responses AK, i.e. in the present case less than 3 responses AK.

The synchronisation which is required for a write request WriteRQ is carried out by the involved mirrors SP in order to ensure that all nm mirrors SP are updated with the same data. If a mirror SP receives a write request WriteRQ, it sends this write request WriteRQ to all other nm−1 mirrors SP. Only if the sending mirror SP receives a response AK from all other nm−1 mirrors SP the write request WriteRQ is executed. Thereby the write request WriteRQ received by the mirror SP can be sent either from a client CL or from another mirror SP of the same compound.

If a mirror SP receives another write request WriteRQ from a mirror SP with a lower index, previously arrived write requests WriteRQ are overwritten in all mirrors. Moreover, a mirror SP does not accept further write requests WriteRQ from a client CL if already a not fully executed write request WriteRQ has arrived from another mirror SP or client CL.

It is possible to execute find requests FindRQ and write request WriteRQ in a combined manner as find/write requests Find/WriteRQ, but it is to be checked whether the additional time requirement is reasonable.

An add request AddRQ serves to integrate a field F which is not yet included in the cluster compound CV into the cluster compound CV. Such an add request AddRQ can be sent from a cluster C or a client CL.

An individual cell, e.g. the cell C2Z6 from FIG. 4, receives an add request AddRQ from the client CL to work as a mirror manager and to integrate nm−1 (i.e. 2) new mirrors SP into the cluster compound CV. In the currently preferred embodiment of the invention, one cell Z is always selected a mirror manager which itself is no mirror SP. However, embodiments of the invention are possible where the mirror manager itself is also a mirror. The cell C2Z6 working as the mirror manager sends an add request AddRQ for 2 mirrors into the network N. The add request AddRQ is relayed from cluster C to cluster C in the cluster compound CV, e.g. from cluster C2 to cluster C3, with the number of the mirrors SP to be added being decremented upon relay of the add request AddRQ, when the last requested cluster C has provided a cell Z.

The last requested cluster C sends the identifications ZellID of the cells Z which are considered as mirrors SP to the cell C2Z6 working as the mirror manager. The cell C2Z6 working as the mirror manager then sends a corresponding response AK to all cells C3Z1 and C1Z2 which are possible as mirrors SP, preferably a pseudoreliable message PSM which instructs them to become mirrors SP. Then the cell C2Z6 working as the mirror manager returns a corresponding response AK to the requesting client CL. An add request AddRQ is not completed successfully if no response AK or a negative response AK is returned from the cell C2Z6 working as the mirror manager.

Pseudocode for the execution of an add request AddRQ:
rq_addField:
begin
if (status< >cs_idle) or (used) then exit;
    message.command:=ak_addField;
<store additional values for request,
    e.g. data, field position, etc. for later
relay to the mirrors SP>
fieldpos:=message.dataFieldPos;
data:=message.data;
mirManClient:=message.sender;
repeat_rq_emptycells:=c_repeat_rq_emptycells;
psm_send(message,message.sender,cs_mirrorManager1);
exit;
end;

The execution of an add request AddRQ does not guarantee that nm mirrors SP are as available for a desired field F, but that either nm mirrors SP are available or after the elapse of a predetermined time t no mirrors SP at all are available for the desired field F.

If less than nm new mirrors SP exist after the execution of an add request AddRQ this can only occur if the pseudoreliable messages PMSM used in the add request AddRQ provide wrong results. Such faults are corrected by later self checks of the mirrors SP.

A mirror request SpiegelRQ (MirrorRQ) is a special case of an add request AddRQ, wherein a cell Z which will be referred to a manager in the following requests a single mirror SP. The manager sends the request to the cells Z which are possible as mirrors SP to become new mirrors SP.

If the manager sends a mirror request SpiegelRQ into the network N, a waiting time WT is recorded from this moment on until responses AK of the cells Z possible as mirrors SP arrive at the manager. Each cluster C which receives the mirror request SpiegelRQ and can provide storage space sends a corresponding response AK to the manager and provides storage space which is kept free to be integrated into the cluster compound CV in the form of a cell Z or a mirror SP, respectively. If a cluster C cannot provide a mirror SP, it relays the mirror request SpiegelRQ to other clusters C. When the manager has received a corresponding response AK of a new mirror SP it will enter this in a mirror table. If a cell Z which is possible as a mirror SP received a message MSG from the manager prior to the elapse of the time interval wt that no more mirrors SP are required, it is released again and the mirror request SpiegelRQ is rejected.

If a timeout occurs in one of the requested cells Z, i.e. the time interval wt of the mirror request SpiegelRQ for this cell Z has elapsed, then a new cell Z which is possible as a mirror is found. This operation is repeated several times or until cells Z possible as mirrors have responded. Cells Z which have made themselves available as possible mirrors SP and whose responses AK arrive at the manager after the assigned time interval wt will be ignored by same.

Pseudocode for carrying out a mirror request SpiegelRQ:
cs_getOneNewMirror0:
begin
message.command:=rq_needEmptyCells;
<select destination cluster>
message.ticket=makeNewTicket;
psm_send(r,r.dest,cs_getOneNewMirror1);
exit;
end;

Either the mirror SP receives a response AK or the mirror request SpiegelRQ becomes invalid:
cs_getOneNewMirror1:
begin
  if psm_timeout then begin
    status:=cs_idle;
    exit;
  end;
  possibleMirror:=<received address>
  message.command:=rq_singlebecomeMirror;
  <write own address and addr. of the other valid mirror into the message>
  psm_send(r,possibleMirror[1],cs_getOneNewMirror2);
  exit;
end;

The still not used mirror SP receives the mirror request SpiegelRQ to become a mirror which it processes with the following pseudocode:
rq_singlebecomeMirror:
begin
  if <request from same mirror1> and <ticket in agreement> then begin
    <return acknowledgement>
    exit;
  end;
  if used then exit;
  <return acknowledgement
    <notice MirrorManager and ticket>
  <Send rq_addMirror to all old mirrors>
    exit;
end;

Now this mirror candidate sends a request to all nm−1 old mirrors SP to be accepted as a mirror (rq_addMirror). Because the old mirrors SP must certify this mutually the cell might have to wait longer than normal for a response to the message. A mirror SP which has received this request enquires all other nm−2 mirrors SP whether these have received this request, too (rq_certify). Only if this is the case, the mirror SP replies with a corresponding response ak_addmirror and updates its own mirror table:
rq_addMirror:
begin
  <set flags, if req'd to accept messages>
  if <request is from mirror 1> then begin
    <update message with data corr. to LifeCount>
    <send acknowledgement ak_akkMirror>
    exit;
  end;
  if <message is from mirror candidate (anew)> then exit;
  if <Status is not correct> then exit;
  if not <mirror to be replaced is known> then exit;
  <further plausibility checks, if req'd.>
  <Send request to all nm−2 mirrors whether message received, too>
end;

Finally, the mirror candidate updates its data:
cs_becomeSingleNewMirror1:
begin
  if not <all nm−1 old mirrors have sent ak_addMirror> then begin
    status:=cs_idle;
    exit;
  end;
  <take over mirror data>
  <take over data (field value etc.)>
  <establish own index>
  used:=true;
  status:=cs_idle;
  exit;
end;

In order to remove a field F from the cluster compound CV, a client CL or a cluster C, for example, sends a delete request DeleteRQ to all nm mirrors SP associated with the field F. A delete request DeleteRQ ensures that either all nm mirrors SP are removed or, in the case of a not successful execution of the delete request DeleteRQ, that no mirror SP is removed in order to ensure consistent data in the cluster compound CV.

Optionally, each mirror SP which receives a delete request DeleteRQ relays it to the other nm−1 mirrors SP. A mirror which receives a delete request DeleteRQ "deletes" itself, i.e. the respective cell Z changes into an idle state and informs the sender of the delete request DeleteRQ about this with a corresponding response AK.

A delete request DeleteRQ is executed successfully if the sender receives nm responses AK according to the which nm mirrors SP of the field F have deleted themselves. If the sender does not receive a response AK after the elapse of a predetermined time interval, according to which the nm mirrors SP of the field F have deleted themselves, the delete request DeleteRQ has failed.

Pseudocode for the execution of a delete request DeleteRQ:
rq_delete:
begin
  if status< >cs_idle then exit;
  if used and (message.ticket=lmticket) and
    (message.sender=lmAdr) then
  begin
    return_msg(message,ak_delete);
    exit;
  end;
  return_msg(m,ak_delete);
  lmTicket:=message.ticket;
  lmAdr:=message.sender;
  <Initialise cell in the initial state>
  used:=false;
  status:=cs_idle;
  exit;
end;

Shift operations are used for assigning individual mirrors SP of a mirror compound to other cells Z which then replace the previous mirrors SP accordingly. There are various reasons which necessitate shift operations:

Failure of a cluster C or individual cells Z
Removal of a cluster C from a cluster compound
Inadequate data transmission performance of a cluster C
Application-specific causes/reasons.

The shifting of mirrors SP upon the request of new mirrors SP has already been described above. If a cluster C is to be removed from the cluster compound CV, for example, when a cluster C is to be shut down or to be used for other tasks in the network N, the data of its active cells Z, i.e. of the cells Z which operate as mirrors SP, must be shifted to other clusters C. In this case the cluster C to be removed initiates the shifting of the data or of the mirrors SP, respectively, of the individual mirror compounds (as described above).

For initiating shift operations due to an inadequate data transmission performance, the data transmission performance of the clusters C and/or the cells Z is checked during operation. For this purpose, the preferred embodiment of the present invention uses a counter for each mirror SP and/or each cell Z which determines the transmission duration with pseudoreliable messages PSM. Optionally, a timer is implemented which determines the average data trans-mission duration, with a common time basis being required in this case. Preferably, each cluster C determines the data transmission performances of its cells Z. Mirrors SP or cells Z, respectively, whose data transmission durations exceed certain limits are shifted.

The evaluation of the data transmission performance with respect to the data transmission duration, however, is to be understood as an example only, and any desired parameter of data transmission performances which is suitable for the application of the invention can be checked for an initiation of shift operations by means of known methods. For example, the computing performance of individual cells Z and/or clusters C, or the performance of individual areas of the network N could be checked.

If such an inadequate data transmission performance has been determined for a mirror SP, e.g. cell C6Z2 from FIG. 2, a single mirror SP from the corresponding compound becomes the manager, e.g. cell C1Z4. The manager C1Z4 sends a request RQ, preferably with a pseudoreliable message PSM, to all other two cells C3Z6 and C6Z2 of the compound operating as mirrors SP to remove the corresponding mirror SP (C6Z2). This makes itself invalid or is declared invalid by the corresponding cluster C6.

Thereupon the manager C1Z4 requests a new mirror SP in the cluster compound CV, whereby contrary to the above described replacement for a mirror SP additional requirements can be placed on the new mirror SP, preferably requirements with respect to the data trans-mission performance. The new mirror SP is integrated into the mirror compound in the above described manner.

In order to ensure that all mirrors SP have received information on the shift operation the manager sends a request RQ (preferably with a pseudoreliable message PSM) for cancelling the shift operation if it has not received a corresponding response AK from all nm−1 mirrors SP. In this case, the shift operation could not be completed successfully.

The operations described above in conjunction with cells Z and mirrors SP are also applicable to operations with respect to the inventive clusters C. For this reason, a detailed description of the operations for adding, removing, shifting, and deactivating of individual clusters C is dispensed with.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A data management system comprising:
   at least two data storage units;
   at least one computer unit that stores at least one complete file, each file including a plurality of individual pieces, the pieces containing parts of the files, wherein at least one piece is stored in a redundant manner in the at least two data storage units;
   a controller to enable data transmission between the data storage units and the computer unit;
   wherein at least one of the data storage units and computer unit measures a data transmission performance between at least one of the data storage units and the computer unit, the at least one piece being stored by the computer unit in a redundant manner in the data storage units as a function of the measured data transmission performance, and the computer unit accessing the at least one of the data storage units as a function of the measured data transmission performance; and
   wherein at least one of the at least two data storage units measures a data transmission performance between at least two of the at least two data storage units and the data storage units copy pieces that are redundantly stored in the system from one of the data storage units to another of the data storage units independently of an access of the computer unit based on the data transmission performance measured between the data storage units.

2. The data management system of claim 1, wherein the at least one computer unit and the at least two data storage units are connected over a wireless network.

3. A data management system comprising:
   at least one computer unit that stores at least one complete file, each file including a plurality of individual pieces, the pieces containing parts of the files; and
   at least two data storage units that need not store the complete file stored in the at least one computer unit at a given point in time, wherein at least one piece is stored in a redundant manner in the at least two data storage units;
   a controller to enable data transmission between the data storage units and the computer unit;
   wherein at least one of the data storage units and computer unit measures a data transmission performance between at least one of the data storage units and the computer unit, the at least one piece being stored by the computer unit in a redundant manner in data storage units as a function of the measured data transmission performance, and the computer unit accessing the at least one of the data storage units as a function of the measured data transmission performance; and
   wherein at least one of the at least two data storage units measures a data transmission performance between at least two of the at least two data storage units and the data storage units copy pieces that are redundantly stored in the system from one of the data storage units to another of the data storage units independently of an access of the computer unit based on the data transmission performance measured between the data storage units.

4. The data management system of claim 3, wherein the at least one computer unit and the at least two data storage units are connected over a wireless network.

5. A data management system comprising:
   at least one first means for storing at least one complete file, each file including a plurality of individual pieces, the pieces containing parts of the files; and
   at least two second data storage means for storing data, that need not store the complete file stored in the first means at a given point in time, wherein at least one piece is stored in a redundant manner in the at least two second data storage means;

control means for enabling data transmission between the second data storage means and the first means;

wherein at least one of the first means for storing or second data storage means measures a data transmission performance between at least one of the second data storage means and the first means, the at least one piece being stored by the first means in a redundant manner in the second data storage means as a function of the measured data transmission performance, and the second data storage means accessing the at least one of the second data storage means as a function of the measured data transmission performance; and wherein at least one of the at least two second data storage means measures a data transmission performance between at least two of the at least two second data storage units and the second data storage means copy pieces that are redundantly stored in the system from one of the second data storage means to another of the second data storage means independently of an access of the first data storage means based on the measured data transmission performance between the second data storage means.

6. The data management system of claim 5, wherein the at least one first means and the at least two second data storage means are connected over a wireless network.

7. A method for a data storage device to copy data over a network by receiving data from or sending data to at least one of a plurality of data storage devices in which data is stored redundantly as a function of measured data transmission performance between computer units that store at least one complete file of data, each file including a plurality of individual pieces of data, the pieces containing parts of the file, and between the plurality of data storage devices, the method comprising the steps of:

receiving in the at least one data storage device at least one piece of data stored by a computer unit in a redundant manner in at least two data storage devices as a function of a measured data transmission performance between the at least one data storage device and the computer unit;

storing in the at least one data storage device the received piece of data;

measuring by the at least one data storage device a data transmission performance between the at least one data storage device and another one of the plurality of data storage devices; and sending from the at least one data storage device to the another data storage device a copy of the received piece of data for redundant storage independently of an access of the computer unit as a function of the measured data transmission performance between the data storage devices.

8. A method for a data storage device to copy data over a network as recited in claim 7, further comprising the steps of:

receiving in the at least one data storage device a second piece of data stored by a computer unit in a redundant manner in at least two data storage devices as a function of a measured data transmission performance between the at least one data storage device and the computer unit;

storing in the at least one data storage device the received second piece of data;

measuring by the at least one data storage device a data transmission performance between the at least one data storage device and another one of the plurality of data storage devices; and sending from the at least one data storage device to the another data storage device a copy of the received second piece of data for redundant storage independently of an access of the computer unit as a function of the measured data transmission performance between the data storage devices.

9. A method for a data storage device to copy data over a network as recited in claim 8, wherein pieces of data are received, stored and sent between the plurality of data storage devices until the complete file of data has been received.

10. A method of operating a network over which a plurality of data storage devices copy data which is redundantly stored as a function of measured data transmission performance between computer units that store at least one complete file of data, each file including a plurality of individual pieces of data, the pieces containing parts of the file, and between the plurality of data storage devices, the method comprising the steps of:

providing a transmission medium enabling transmission of the data between one or more of the plurality of data storage devices and the computer unit; and providing access by a user of at least one data storage device to the transmission medium for:

(i) receiving in the at least one data storage device at least one piece of data stored by a computer unit in a redundant manner in at least two data storage devices as a function of a measured data transmission performance between the at least one data storage device and the computer unit;

(ii) storing in the at least one data storage device the received piece of data;

(iii) measuring by the at least one data storage device a data transmission performance between the at least one data storage device and another one of the plurality of data storage devices; and (iv) sending from the at least one data storage device to the another data storage device a copy of the received piece of data for redundant storage independently of an access of the computer unit as a function of the measured data transmission performance between the data storage devices.

11. A method of operating a network over which a plurality of data storage devices copy data, as recited in claim 10, further comprising the steps of:

providing access by the user of the at least one data storage device to the transmission medium for:

(i) receiving in the at least one data storage device a second piece of data stored by a computer unit in a redundant manner in at least two data storage devices as a function of a measured data transmission performance between the at least one data storage device and the computer unit;

(ii) storing in the at least one data storage device the received second piece of data;

(iii) measuring by the at least one data storage device a data transmission performance between the at least one data storage device and another one of the plurality of data storage devices; and (iv) sending from the at least one data storage device to the another data storage device a copy of the received second piece of data for redundant storage independently of an access of the computer unit as a function of the measured data transmission performance between the data storage devices.

12. A method of operating a network over which a plurality of data storage devices copy data, as recited in claim 11, wherein pieces of data are received, stored and sent between the plurality of data storage devices until the complete file of data has been received.

13. A data storage device for copying data over a network by receiving data from or sending data to at least one of a plurality of data storage devices in which data is stored redundantly as a function of measured data transmission performance between computer units that store at least one complete file of data, each file including a plurality of individual pieces of data, the pieces containing parts of the file, and between the plurality of data storage devices, comprising:
- a memory configured to store data received by the data storage device; and
- a processor, connected to said memory, configured to:
  - (i) receive at least one piece of data stored by a computer unit in a redundant manner in at least two data storage devices as a function of a measured data transmission performance between the data storage device and the computer unit;
  - (ii) store in said memory the received piece of data;
  - (iii) measure a data transmission performance between the data storage device and another one of the plurality of data storage devices; and
  - (iv) send from the data storage device to the another data storage device a copy of the received piece of data for redundant storage independently of an access of the computer unit as a function of the measured data transmission performance between the data storage devices.

14. A data storage device for copying data over a network as recited in claim 13, wherein the processor is further configured to:
- (v) receive a second piece of data stored by a computer unit in a redundant manner in at least two data storage devices as a function of a measured data transmission performance between the data storage device and the computer unit;
- (vi) store in said memory the received second piece of data;
- (vii) measure a data transmission performance between the data storage device and another one of the plurality of data storage devices; and
- (viii) send from the data storage device to the another data storage device a copy of the received second piece of data for redundant storage independently of an access of the computer unit as a function of the measured data transmission performance between the data storage devices.

15. A data storage device for copying data over a network as recited in claim 14, wherein the processor is further configured to receive, store in said memory, and send between the plurality of data storage devices until the complete file of data has been received.

* * * * *